(12) United States Patent
Akopian et al.

(10) Patent No.: US 6,459,407 B1
(45) Date of Patent: Oct. 1, 2002

(54) CROSS-CORRELATION SYSTEM FOR TIME RECOVERY IN NETWORK-ASSISTED GPS POSITIONING

(75) Inventors: David Akopian; Jari Syrjärinne, both of Tampere (FI)

(73) Assignee: Nokia Mobile Phones, Espoo (FI)

( * ) Notice: Subject to any disclaimer, the term of this patent is extended or adjusted under 35 U.S.C. 154(b) by 0 days.

(21) Appl. No.: 09/950,551

(22) Filed: Sep. 10, 2001

(51) Int. Cl.[7] .............................. G01S 5/02; H04B 7/185
(52) U.S. Cl. .................... 342/357.12; 342/378; 701/213
(58) Field of Search ..................... 342/357.12, 378; 701/213

(56) References Cited

U.S. PATENT DOCUMENTS

| 5,798,732 A | 8/1998 | Eschenbeck | 342/357 |
| 6,052,081 A | 4/2000 | Krasner | 342/357.02 |

FOREIGN PATENT DOCUMENTS

| EP | 1115008 A2 | 7/2001 |
| EP | 1146349 A2 | 10/2001 |
| WO | WO 99/26370 | 5/1999 |

OTHER PUBLICATIONS

Finnish patent application: FI20010212 (Nokia ref: 32498; Priority date: 5th of Feb. 2001), along with English language abstract.

Primary Examiner—Theodore M. Blum
(74) Attorney, Agent, or Firm—Ware, Fressola, Van Der Sluys & Adolphson LLP

(57) ABSTRACT

A method and apparatus for measuring time related to satellite navigation data messages used with a satellite-based global positioning systems (GPS). A first record of at least a portion of a satellite data message is received at an entity, which is typically a base station of a wireless communication system. The first record is compared with a second record of the same satellite data message (navigation message) received by a GPS receiver. From the comparison, a time is determined indicating when the satellite date message was transmitted (broadcast). The comparison is made in a way that accounts for the only approximate removal of all modulation of the satellite data message by the acquisition and tracking stages of the GPS receiver.

24 Claims, 4 Drawing Sheets

CROSS-CORRELATION SYSTEM FOR TIME RECOVERY IN NETWORK-ASSISTED GPS POSITIONING

FIELD OF THE INVENTION

The invention relates to global positioning systems, and more particularly to synchronizing the clocks (system time) used by receivers making use of information provided by such positioning systems.

BACKGROUND OF THE INVENTION

In the well known Global Positioning System (GPS), synchronization to system time (also called GPS time) is a key function of any GPS receiver. GPS-based receiver positions are determined by the intersection of a series of simultaneous ranges to orbiting satellite vehicles (SVs). The ranges are established on the basis of the time that elapses between when each SV transmits a ranging signal and when the ranging signal is received by the receiver, multiplied by the speed of light. A ranging signal includes an indication of when, according to system time, the ranging signal was transmitted by the SV. The ranging system is included in what is called the navigation data provided by each SV, which also includes information needed by a receiver to construct satellite orbits (position as a function of system time). The navigation message is a 50 Hz signal consisting of data bits that describe the GPS SV orbits, clock corrections, and other system parameters. If either the SV orbital position data or the GPS time data in the receiver calculations are incorrect or incomplete, as for example when the navigation data provided by a satellite as part of the ranging signal cannot be demodulated correctly due to noisy or weak signal conditions, then substantial positioning errors can result. In such conditions, network-based timing assistance can be used to help reconstruct GPS time information, i.e. to help determine when a ranging signal arrives according to GPS time. GPS time is a "paper clock" ensemble of a Master Control Clock and the SV clocks. GPS time is measured in weeks and seconds from 24:00:00, Jan. 5, 1980, and is steered to (but not synchronized to) within one microsecond of universal coordinated time (UTC); GPS time has no leap seconds and is ahead of UTC by several seconds. What is here called SV time is the time maintained by a satellite, usually using four atomic clocks (two cesium and two rubidium), monitored by ground control stations and occasionally reset to maintain time to within one-millisecond of GPS time; clock correction data bits reflect the offset of each SV clock from GPS time.

The navigation message consists of time-tagged data bits organized into frames of 1500 bits divided into five 300-bit subframes; the time-tagged data bits mark the time of transmission of each subframe. (Each subframe indicates when the first bit of the next subframe is to be broadcast, according to SV time). Since the GPS Navigation Message is broadcast at 50 Hz, a data frame is transmitted every thirty seconds, and a subframe every six seconds. Three six-second subframes contain orbital and clock data. SV clock corrections are sent in subframe one and precise SV orbital data sets (ephemeris data parameters) for the transmitting SV are sent in subframes two and three. Subframes four and five are used to transmit different pages of system data. An entire set of twenty-five frames (125 subframes) makes up what is referred to as a complete navigation message, which is sent over a 12.5 minute period.

The basic operation in GPS based positioning assumes an estimate of a signal receiving time and signal transmitting times from each of several satellites (ideally at least four), which are used to calculate satellite positions and then the ranges from the satellites to the user (GPS receiver). The transmitting time estimates can be obtained from a knowledge of three components, namely, a Time of Week (TOW) component (with a precision of six seconds), a second, millisecond component related to a number of milliseconds that have elapsed since the beginning of a subframe, and a third, sub-millisecond component.

The standard positioning mechanism proceeds as follows. First, from the data message provided by the SV signal, the TOW at which the SV signal was transmitted is found, i.e. the time according to the GPS receiver at which the bits indicating the TOW are received is noted by the GPS receiver. From that time, the GPS receiver counts the number of milliseconds and sub-milliseconds. (The sub-millisecond component is provided based on a correlation of the spread spectrum signal bearing the received data message with a replica, and the millisecond component is provided based on the difference between the latest millisecond count and the millisecond count at TOW. When the satellite is tracked there is an internal millisecond counter that counts from some arbitrary instant of time the number of code epochs, i.e. code periods. Given the millisecond count at the TOW point of a received signal and also the latest millisecond count, both measured from some same point in time, the difference is the millisecond count from TOW.) The time of transmission is then computed as:

$$t_{trans} = TOW + \text{milliseconds} + \text{sub-milliseconds},$$

and the pseudorange is formed as:

$$\text{pseudorange} = \text{estimate of time of reception} - t_{trans}.$$

The estimate of the time of reception is often computed as the time of transmission for one of the channels plus a nominal time of flight (such as e.g. 70 msec).

As indicated above, in determining the pseudorange according to the standard procedure, the GPS receiver should be synchronized to the GPS time (so as to be able to determine the time that has elapsed since a TOW signal was transmitted by a SV and received by the GPS receiver). Multiple SVs and a navigation solution (or a known position for a timing receiver) permit SV time to be set to an accuracy limited by the position error and the pseudorange error for each SV. After a GPS receiver precisely determines SV time for a satellite, it converts it to GPS time using information provided in the navigation message.

As mentioned, the TOW count is reported in the navigation message every six seconds; however, in weak signal conditions, demodulation of navigation data is sometimes not possible. In such conditions, time assistance from a cellular network (via a base station of the cellular network) accurate to within a few seconds can provide the TOW count, and the sub-millisecond component can be obtained from a receiver using state-of-the-art acquisition and tracking techniques. However, when the navigation message cannot be demodulated and when any network assistance provides insufficiently accurate timing information, the millisecond part of the time must be recovered using other methods (because cellular assistance and state-of-the-art acquisition techniques are of no use in providing an estimate of the millisecond part).

For the millisecond part, cross-correlation is used in case of poor signal conditions to align the earlier-received reconstructed GPS navigation signal subframes or bit sequences with the same information elements received subsequently, but the cross-correlation technique should account for the sinusoidal modulations of the carrier signal remaining after the tracking phase in the GPS receiver, modulation caused by Doppler shifting and by clock drift, what are here called residual sinusoidal modulations. If the residual modulations are not compensated for, modulation of the satellite carrier signal by sinusoidal modulation due to Doppler frequency and clock drift makes conventional cross-correlation to determine the time of transmission ineffective.

The Problem that the Invention Overcomes

The invention is of use in case of a GPS receiver tracking a satellite, but in a situation where the satellite navigation data cannot be decoded (for example because of poor signal conditions).

The invention overcomes the problem of determining GPS time in case of a poor-quality SV signal, poor enough in quality that the navigation data cannot be decoded from the SV signal by the GPS receiver and the tracking component of the receiver does not completely compensate for the Doppler frequency shift and clock drift. The invention improves on the prior art in that it compensates for the Doppler frequency shift and clock drift, what are here called residual sinusoidal modulations (i.e. sinusoidal modulations attributable to Doppler shifting and clock drift that remain after the tracking component processes the received signal). The invention provides a more accurate millisecond component of the SV time (SV time referring to the elapsed time between when a time-stamped signal was transmitted by the SV, and when it is received by the SV) than the prior art under the same poor signal conditions (by compensating for the residual sinusoidal modulations). In the prior art methods being improved on by the invention, code tracking is performed as in the standard procedure, i.e. the C/A code is wiped-off as usual, providing the sub-millisecond component, but since the navigation data are assumed noisy and cannot be demodulated, the millisecond component is not provided by the standard procedure.

The correlation method of the invention utilizes the idea that the navigation data transmitted by a satellite is approximately known (usually from some source of assistance, such as a cellular network) and the signal bearing the navigation data can be correspondingly approximately reconstructed. The invention then uses the approximately reconstructed signal to determine where in the actually received signal individual components (such ephemeris, almanac or other component) of the navigation data occur. (As mentioned above, some prior art uses the same idea of reconstruction, but does not compensate for residual sinusoidal modulations as the invention does.)

Under the assumed conditions, the received navigation data are noisy, so that the GPS receiver cannot properly decode the navigation data as in the standard procedure, but using cross correlation according to the prior art and also according to the invention (which provides improved accuracy) the GPS receiver attempts to identify an entire set of data (such as the ephemeris data) all at once, which is easier to do than identifying individual elements of a set of data since identifying an entire set of data allows integrating over several data bits. A particular set of received data is identified by correlating the received signal with a signal including the particular set of data that is constructed by the GPS receiver (or by the source of assistance). The GPS receiver then correlates the received signal with the constructed signal and so determines where the set of data occurs in the received signal based on when a match appears while sliding the constructed signal over the received signal (or, equivalently, sliding the received signal over the reconstructed signal). Knowing where the set of data occurs in the received signal is all that is needed to determine the millisecond component. Thus, in the invention, the TOW and millisecond component is provided by the source of assistance and cross-correlation with the constructed signal based on the network assistance, and the sub-millisecond component is provided as usual. The millisecond component, in combination with the sub-millisecond component gives us the pseudorange. The pseudorange is then used in (for example) a least squares or Kalman filter solution to determine the GPS receiver position and time (at which the GPS receiver is determined to have the calculated position), according to GPS time.

Thus also in the method being improved on by the invention, a correlation is performed over a series of navigation data bits, whereas a conventional cross-correlation is likely to fail when performed over a series of navigation data bits, even in case of perfect alignment of the data bits because in conventional cross-correlation, modulation by the Doppler shifting and clock drift, i.e. the residual sinusoidal modulations, is not removed from the signal. To increase the likelihood of a successful correlation over such a long period of time (length of signal encompassing at least several if not many navigation data bits), it is essential to compensate for any residual sinusoidal modulation.

What is Still Needed

What is needed is an improved method by which a GPS receiver can set itself to GPS time based on the observed time of arrival (per the GPS receiver clock) of signals broadcast in poor signal conditions from a SV, by relying on assistance from as base station (having access to a higher quality signal), a method that accounts for sinusoidal modulation of the satellite signal caused by Doppler shifting and clock drift.

SUMMARY OF THE INVENTION

Accordingly, the invention provides a system, apparatus and corresponding method for determining the time at which a satellite vehicle (SV) signal received by a mobile receiver was broadcast by the SV, the SV signal having been de-spread and approximately demodulated but including some residual modulation (often a residual sinusoidal modulation), the mobile receiver being located in the coverage area of a station of a wireless communication system, the method including the steps of: having a correlator of the mobile receiver be provided with the SV signal; having the station provide to the mobile receiver the content of at least a portion of the same SV signal; having the mobile receiver perform a correlation of the SV signal with a replica of at least a portion of the SV signal determined from the content of a portion of the SV signal provided by the station; and determining the time at which the signal was broadcast by the SV on the basis of the correlation; wherein the correlation is performed in a way that accounts for any residual modulation of the SV signal by an operation that involves multiplying the SV signal by sinusoids or approximated sinusoids at discrete frequencies spanning a range that encompasses the frequency of the residual modulation.

In a further aspect of the invention, the station constructs the replica on the basis of the content of a portion of the SV signal received by the station.

In another further aspect of the invention, the mobile receiver constructs the replica on the basis of the content of a portion of the SV signal received by the station.

In yet another further aspect of the invention, the multiplying of the SV signal by sinusoids at discrete frequencies is followed by a coherent integration for each discrete frequency.

In still yet even another further aspect of the invention, the multiplying of the SV signal by sinusoids at discrete frequencies is preceded by a plurality of subcorrelations of portions of the replica with correspondingly sized portions of the SV signal, each of which is then multiplied by the sinusoids at discrete frequencies and added together in a coherent integration. In a still further aspect, the method also comprises the step of non-coherently integrating over a plurality of outputs of the coherent integration. In even a still further aspect of the invention, the step of non-coherently integrating over a plurality of outputs of the coherent integration includes a step of performing an operation consisting of either taking the absolute value of each output of the coherent integration, squaring each output of the coherent integration, or, beginning with the second output, multiplying each output of the coherent integration by the complex conjugate of the value of the previous output of the coherent integration.

The present invention thus provides a cross-correlation technique, for use by a GPS receiver (with assistance from a wireless base station) that has received a SV signal, for determining the time according to the GPS master clock at which the SV signal was transmitted by the SV, a technique that is more accurate than what is provided by the prior art in that it compensates for any sinusoidal modulation of the SV signal, due to Doppler frequency shifting and clock drift, that remain after processing of the SV signal by the tracking stage of the GPS receiver. These residual sinusoidal modulations are usually noticeable only over time periods at least comparable to the period of the subframes of a navigation message (six seconds), not over the much shorter time periods used for acquisition and tracking of an SV signal (less than 20 msec, i.e. less than the period/epoch of a single navigation data bit). According to the invention, in one embodiment, a base station of a wireless telecommunication network provides to a GPS receiver at least a portion of the same navigation message the GPS receiver received from the SV. (In another embodiment, the base station does not provide the actual bit pattern/replica, but instead only information sufficient for the GPS receiver to construct the replica.) By correlating according to the invention the replica with the SV signal actually received by the GPS receiver, and by using the knowledge of the location of the base station, the GPS receiver can determine the approximate time at which the SV signal was transmitted by the SV. It is important to understand that under the assumed poor quality SV signal conditions, the GPS receiver cannot read the TOW in the navigation data; for the TOW, the GPS receiver relies on a source of assistance. With such assistance, the GPS receiver can determine during which subframe the signal indicating the TOW was sent (knowing the signal transmission time $T_{trans}$ to within an accuracy of 3 sec, allows determining the subframe using $$\text{subframe}_{TOW}=\text{round}(T_{trans}/6 \text{ sec})*6 \text{ sec}),$$

but to combine the information as to the subframe in which the TOW signal was sent with the sub-millisecond component, the GPS receiver must be able to associate the TOW provided by the source of assistance time with some point on the received signal. To provide the association, the GPS receiver cross-correlates the constructed data bit pattern based on the TOW provided by the source of assistance with the received signal fragment, and at some moment/relative position in the sliding cross correlation there is a match. The GPS receiver stamps the position at which the match occurs with the known TOW. The GPS receiver then determines the millisecond count based on the occurrence of data bit edges (the determination being done differently in different GPS receivers). With the millisecond count at the identified TOW position represented by N, and the millisecond count at the end of the signal represented as M, and with the sub-millisecond count (integer and fractional chip count) represented as $M_s$, the receive time is computed as $$T_{rec}=\text{TOW}+(M-N)*\tau_{code}+M_s*\tau_{chip}$$

where $\tau_{code}$—is the period of the PRN code (0.001 sec), and $\tau_{chip}$ is the chip duration (1/1023000 sec). Thus $$T_{rec}=TOW+(M-N)*0.001 \text{ (in seconds)}+M_s/1023000 \text{ (in seconds)}.$$

The correlation of the invention is performed so as to compensate for any sinusoidal modulation of the SV signal still remaining after the acquisition and tracking stages, i.e. to compensate for residual sinusoidal modulations. The correlation includes what are here called coherent integration stages followed (optionally) by non-coherent integration stages involving a squaring or other type of operation performed to increase system sensitivity. Moreover, the complexity of the system scales with the residual sinusoidal modulation frequency range; an application where the residual sinusoidal modulation is known to be in the range [−50, 50] Hz will require less computation than an application where the residual sinusoidal modulation is known to be in the range [−100, 100] Hz.

The data are in I/Q format (i.e. the data are regarded as a series of complex numbers) and are sampled with multiple bits. Usually on the output of the tracking process, the navigation data are decoded using a threshold. The output for each bit represented by the data is a complex value usually in I/Q (in phase, quadrature phase) format, for example (I,Q)=(123,0.1) or (I,Q)=(−123,0.4). The Q component is small in the tracking process in good signal conditions. If the threshold is for example 10, then the output for (I,Q)=(123,0.1) is taken purely from the I channel and is taken to be the value +1, and for (I,Q)=(−123,0.4) the output is taken to be −1. In poor signal conditions, the tracking process does not provide a small Q component and bits from the I channel are sometimes not identified properly. Instead of outputting incorrect data bits, the invention outputs both the I and Q values and processes them together, which is why there is residual sinusoidal modulation and why the cross-correlation of the invention is applied to complex signals. There could be several samples per data bit in both the I and Q components, each sample in turn being represented by several bits. The data duration is 20 ms. Thus, for example, there could be 5 samples of both the I and Q components, each represented by 4 bits.

As a consequence of not requiring phase lock, however, there can be a residual sinusoidal modulation in the multi-bit I/Q data. The invention, however, efficiently removes the residual sinusoidal modulation. (In U.S. Pat. No. 5,798,732, the issue of possible residual sinusoidal modulation is not considered at all.)

Another difference between the present invention and the method disclosed in U.S. Pat. No. 5,798,732 is in timing. In the present invention, the result of a cross-correlation is not used as such (i.e. to align signals and thereby infer timing information), but is used merely to identify a bit pattern. The actual timing is determined using a separate process. In the present invention, the cross correlation gives time stamp (the TOW) for a position on the received signal, but the actual time of transmission is constructed by adding the millisecond and sub-millisecond component. In addition, there is a position calculation stage to identify the correct reception time in the present invention, whereas in the '732 patent, the reception time is identified indirectly. As mentioned above, the position calculation stage then determines when the time stamped navigation data bit was actually received, according to GPS time, using for example a Kalman filter or other technique to solve for the time of reception as well as the GPS receiver position or velocity.

In contrast with U.S. Pat. No. 6,052,081, the present invention aims to recover GPS time directly from the received data, in real-time. So-called symbol clock synchronization is used in the present invention to time the data bit edges precisely, and pattern matching is used only to identify which portion of the received SV signal corresponds to which data sets (ephemeris, almanac, and so on). Symbol-clock synchronization simplifies the cross-correlation process in case of applications where there are a plurality of samples per bit and navigation data. In symbol clock synchronization, if the location of the bit edges can be determined, then the sliding cross-correlation is performed not by shifting one sample at a time, but by shifting as many samples as correspond to a single bit of navigation data. But for symbol-clock synchronization, the GPS receiver must known which samples correspond to which data bit edges. Otherwise the GPS receiver must cross correlate over all the shifting phases. (There is an algorithm that gives the information as to which bit edges correspond to which samples.) The symbol (data bit) clock is recovered from the received data; it is not provided by a base station. Moreover, the residual sinusoidal modulation in the method described in U.S. Pat. No. 6,052,081 is removed with differential demodulation, while the present invention applies a different technique. The present invention could be used for situations where the satellite signal is only frequency locked (in the worst case), i.e. the residual sinusoidal modulation changes in time.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

According to the invention, a base station of a wireless telecommunication network provides to a global positioning system (GPS) receiver located in the coverage area of the base station a bit pattern that is a (possibly approximate) replica of at least a part of a navigation message actually received by the GPS receiver from a SV of the GPS. The GPS receiver uses the replica to precisely determine the time, according to the GPS master clock, at which the signal was transmitted by the SV. When the GPS receiver receives the SV signal, it processes it according to a tracking stage, which eliminates from the SV signal the spreading code and most of the carrier. However, at least some carrier remains, an amount that is barely noticeable over the periods of time involved in tracking (milliseconds), but still noticeable over time periods involved in reading what is called the navigation message, which is the data content of the SV signal. The GPS receiver correlates the signal it actually received (after processing by the tracking stage) with the replica in a way that compensates for any residual modulation, as explained below.

It is of course not necessary for a base station to provide the needed replica, but only to provide sufficient information for the GPS receiver to construct the replica.

The GPS receiver is assumed to be able to read the navigation message sufficiently to be able to determine the time of week (TOW) component of the time at which the SV signal was broadcast (alternatively, the base station can read the TOW and provide it to the GPS receiver), and is also assumed to be able to eliminate the sub-millisecond ambiguity during the acquisition and tracking stages. Then, once the replica and the actual signal are precisely correlated, which cannot be done without accounting for any residual modulation (which may be due to the Doppler effect and may also be due to slight differences in the rates of the different clocks involved in the process being described, i.e. the SV clock, the GPS receiver clock, the base station clock, and the GPS master clock), and the GPS receiver takes into account the location of the base station, the GPS receiver can eliminate the twenty millisecond ambiguity in the time at which the SV signal was broadcast, and so determine the broadcast time precisely.

Figure 1:
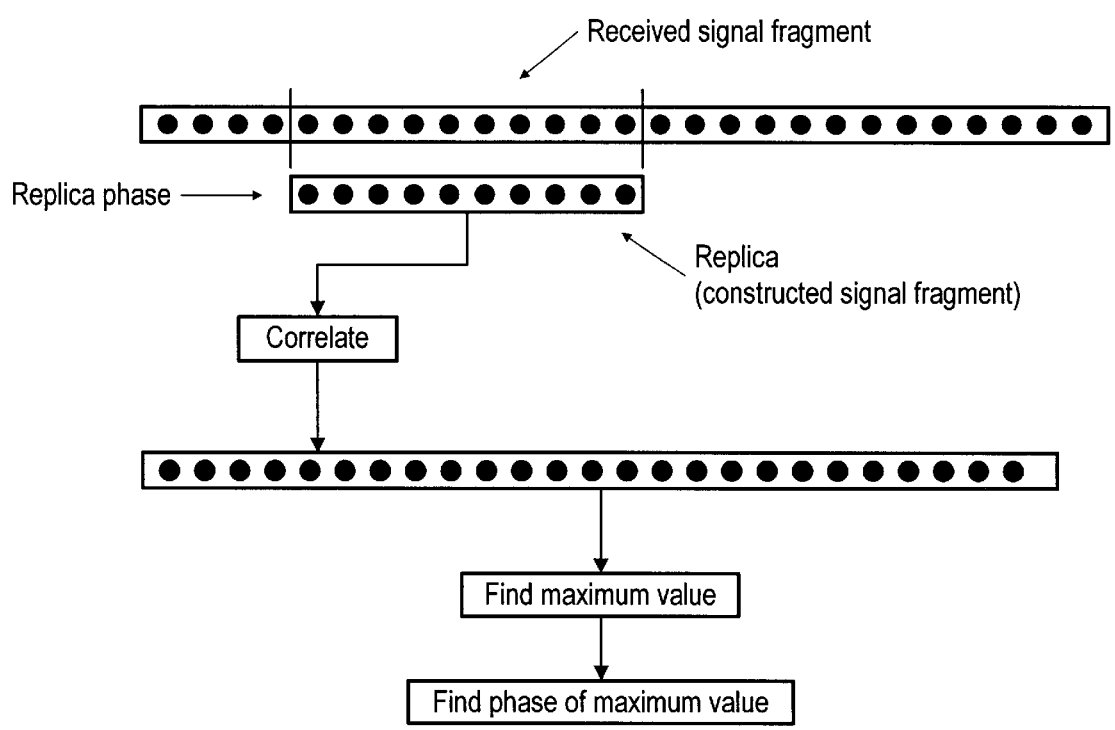
FIG. 1 is a block diagram/flow diagram of an apparatus for performing each possible alignment phase according to the prior art.

According to the prior art as shown in FIG. 1, GPS time is "recovered" by a GPS receiver (i.e. the GPS receiver determines the time according to the GPS master clock at which a particular bit of an SV signal was transmitted by a SV) using a cross-correlation process involving two bit sequences, a received signal and a replica. The replica is made to "slide" over the received signal (or conversely), and at each relative position (phase), a correlation value is computed indicating the correlation between the replica and a segment of the received signal. The phase leading to the largest correlation value is the phase that is most probable. In other words, for best alignment, either the replica or the raw signal should be phase shifted by the phase leading to the largest correlation value.

The algorithm for GPS time recovery used by the prior art (and also the algorithm used by the invention, as described below) uses the following inputs: an array containing the raw received signal ($X_s(n)$), an array containing the replica signal ($X_r(n)$), the lengths of both arrays ($N_s$, $N_r$), a possible range of sinusoidal modulation frequencies ($\Delta F$) still remaining after the tracking stage, the number of samples taken per bit ($k_{s/b}$) of the received signal, and a flag indicating if bit synchronization is performed by some other algorithm so that the data bit edges ($F_{bs}$) are known. In what follows, for ease of discussion, it is further assumed that the replica is sampled at the rate of one sample per bit.

Figure 2:
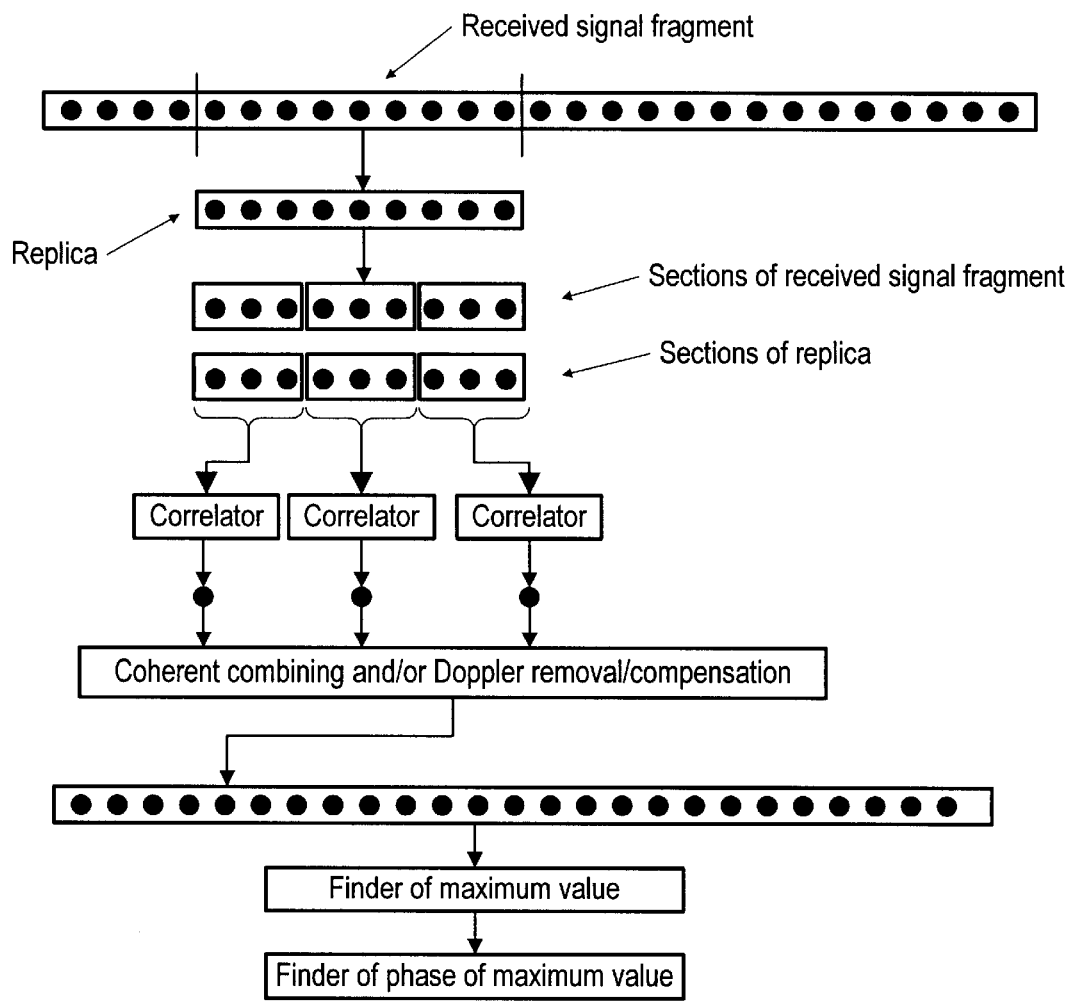
FIG. 2 is a block diagram/flow diagram of an apparatus according to the invention in which cross-correlation is performed with removal/compensation of the residual sinusoidal modulation (the Doppler modulation)

Now, referring to FIG. 2, according to the invention, a correlation process is performed that is similar to the conventional correlation technique illustrated in FIG. 1 in that a replica slides over a segment of the raw signal, but differs from that of the prior art in two ways. First, instead of performing a single correlation of the replica with the raw signal segment, the correlation process is split into several sub-correlations of sections of the raw signal segment, and secondly, the outputs of the different sub-correlations are combined in a way that compensates for the residual sinusoidal modulation of the raw signal segment, a modulation at a frequency that is here called the Doppler frequency, regardless of the extent to which it is attributable solely to a Doppler shift phenomenon.

Still referring to FIG. 2, the length ($N_{ss}$) of each section is preferably calculated based on the maximum possible Doppler frequency $\Delta F$. For example, the length could be calculated according to the following procedure:

$$N_{ss} = floor\left(\frac{1000.0 \cdot k_{s/b}}{20\Delta F}\right); \quad \text{if } (N_{ss} == 0) \text{ then } N_{ss} = 1; \quad (1)$$

in which the algorithm inputs are taken from the tracking channel correlators. (The function floor( . . . ) has as an output the closest integer not exceeding the value of the argument.)

Figure 3:
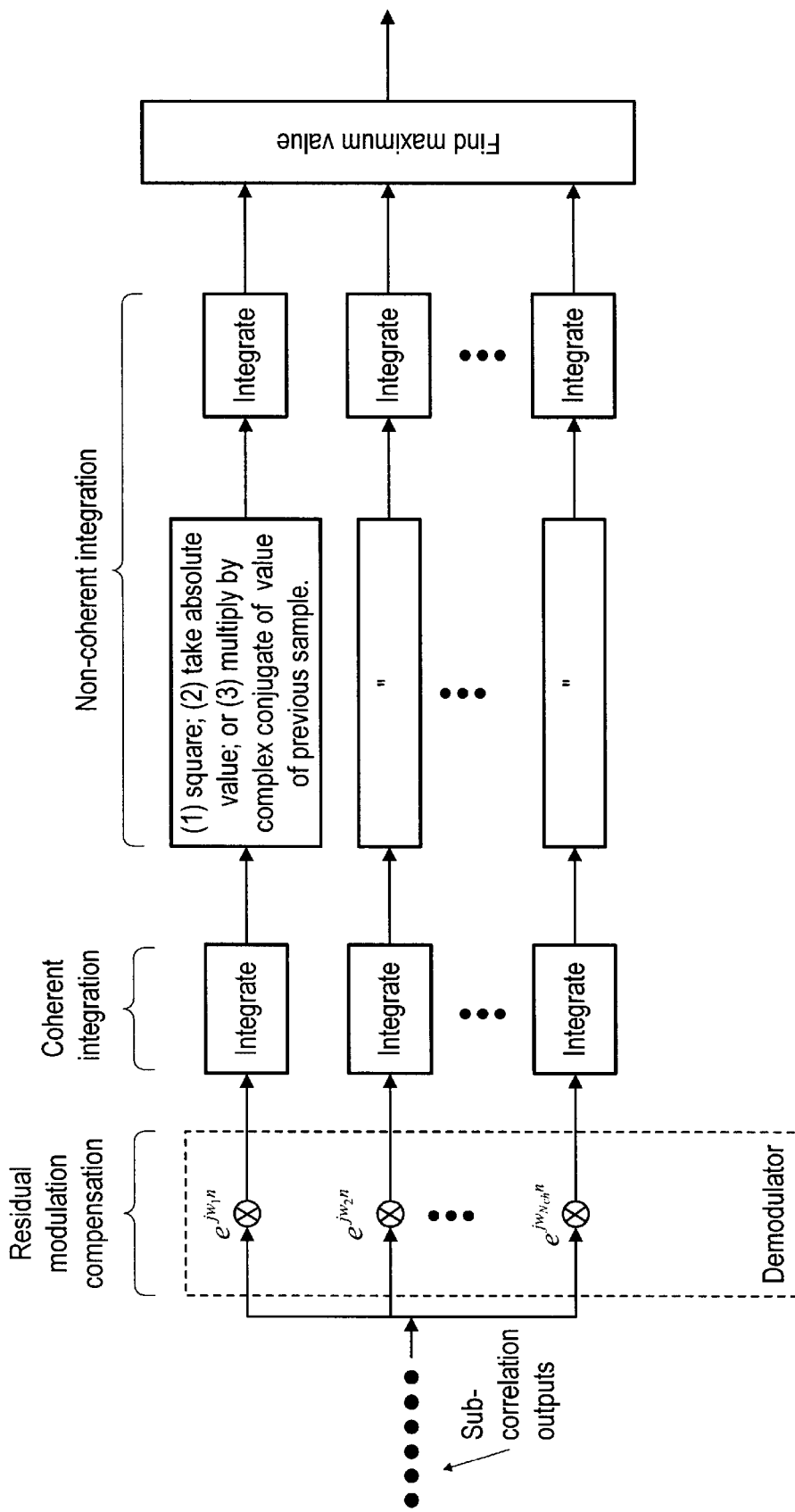
FIG. 3 is a block diagram/flow diagram of an apparatus performing coherent combining and/or Doppler removal/compensation according to the invention.

The coherent combining and residual sinusoidal compensation module has two options by which to compensate for the residual sinusoidal modulation (caused by Doppler shifting and clock drift). In one option, several demodulating channels with different assumed residual modulation frequencies are used. In the other option, each sub-correlation output is multiplied by the (complex) conjugate version of the neighbor sub-correlation output. Preferably, both mechanisms are used, one after the other, as illustrated in FIG. 3. Instead of using both in succession, however, it is possible to eliminate the residual frequency compensation and coherent integration and still find the position at where maximum correlation occurs.

In the system illustrated in FIG. 3, in the residual modulation compensation section, the subcorrelation outputs are first multiplied by complex sinusoidal signals with frequencies spanning a range so that at least one frequency in the range will be close enough to the residual modulation frequency to demodulate the possible (unknown) residual modulation. The result of the multiplication by each different frequency, called here a candidate residual modulation frequency, is then coherently integrated over some length, accounting for the sign of each term being added. (The term coherent integration is used here to distinguish between what is called non-coherent integration, in which the absolute value of each addend is taken before adding it to the sum. Thus, coherent integration is just ordinary integration.)

Still referring to FIG. 3, the coherent integration length and the frequency spacing between channels are related to each other (as is the subsection length and the frequency spacing, as mentioned in connection with equation (1) above). The coherent integration is followed by non-coherent integration over a plurality of the outputs of the coherent integration step (each serving as an addend of the non-coherent integration), using any one of three possible methods for removing the sign dependence of the addend: (1) squaring each sample (addend) before adding it to the sum; (2) taking the absolute value of each addend; and (3) multiplying each addend by the complex conjugate value of the previous sample/addend. The maximum correlation value for all candidate residual modulation frequencies is the output of the non-coherent integration module. (Of course what is wanted is the position at which the maximum occurs, not the value itself, and the position at which the maximum occurs is known from the relative position of the constructed signal and the received signal segment giving the maximum correlation value.) If the residual modulation frequency value itself is of interest, it can be estimated as the value of the candidate residual modulation frequency for which the output was a maximum. For the third case (in which each addend is multiplied by the complex conjugate value of the previous addend), the complex phase corresponding to the maximum (correlation) value provides a finer estimate of the residual modulation frequency than does the candidate residual modulation frequency.

Figure 4:
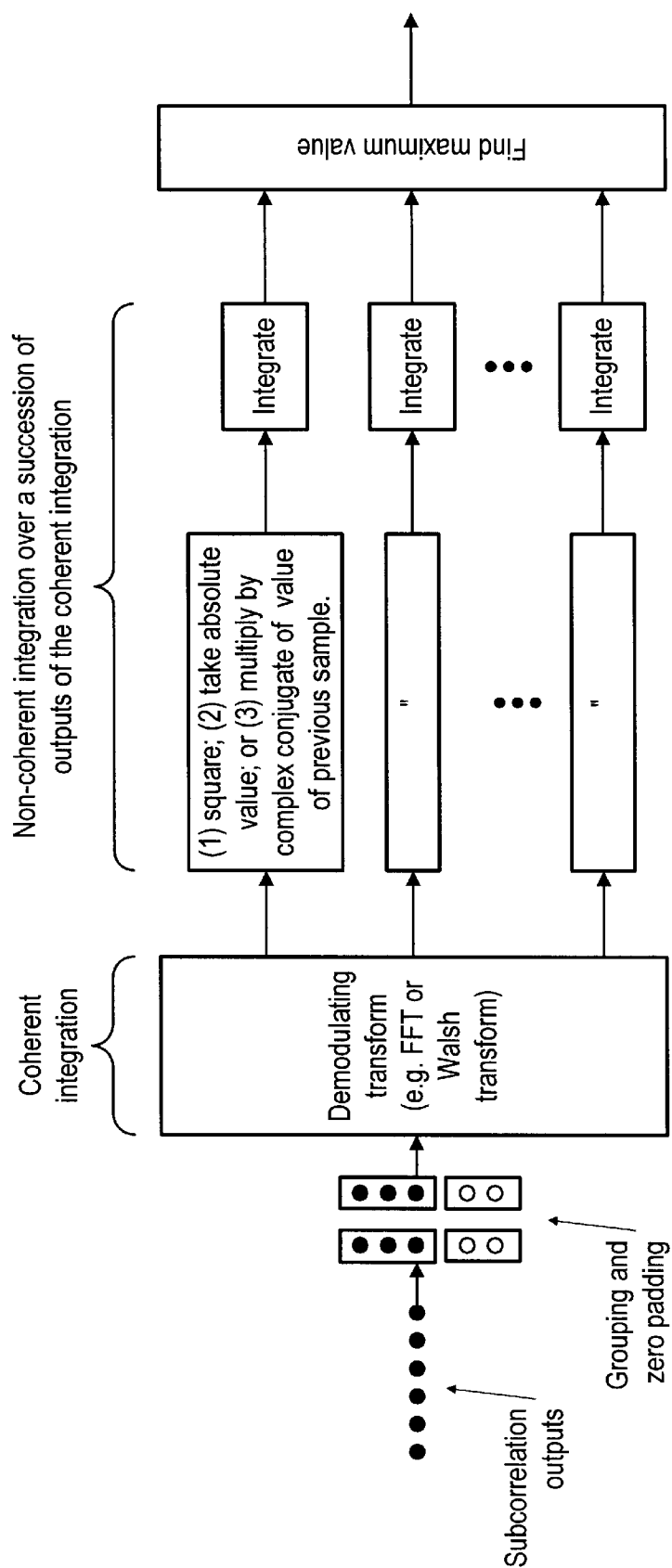
FIG. 4 is a block diagram/flow diagram showing the use of transforms demodulation and coherent combining, according to the invention.

Referring now to FIG. 4, the demodulation and coherent integration stages of the invention can be combined and implemented by using demodulating transforms, as shown in FIG. 4. In addition, zero-padding can be used to choose the frequency spacing between adjacent candidate Doppler frequencies and/or suitable section/integration lengths so as to be able to use fast transforms.

If bit synchronization for determining bit edges of the received signal is performed (by some other algorithm or as an integral part of a system according to the present invention), then the search space reduces as the alignment phases are searched for in a discrete grid by shifting the replica one bit at the time instead of one sample at a time, so that if sampling is done at a rate of e.g. 20 samples per bit, then the step size is 20 samples. Thus, the complexity of the cross-correlation is substantially reduced if bit edge information is available.

SCOPE OF THE INVENTION

It is to be understood that the above-described arrangements are only illustrative of the application of the principles of the present invention. For example, although the invention has been described in the context of a base station of a wireless communication system providing to a mobile receiver the content of a portion of the same SV signal as received by the mobile receiver, the invention encompasses having any entity, i.e. any station, of a wireless communication facility provide such content. In addition, although the invention has been described as including an operation that involves multiplying the SV signal by sinusoids at discrete frequencies spanning a range the encompasses the frequency of the residual modulation, the invention also encompasses using an operation that involves multiplying the SV signal by approximated sinusoids, including for example a sequence of values of +1,−1,+1,−1, and so on. Numerous other modifications and alternative arrangements may be devised by those skilled in the art without departing from the spirit and scope of the present invention, and the appended claims are intended to cover such modifications and arrangements.

What is claimed is:

1. A method for determining the time at which a satellite vehicle (SV) signal received by a mobile receiver was broadcast by the SV, the SV signal having been de-spread and approximately demodulated but including some residual modulation, the mobile receiver being located in the coverage area of a station of a wireless communication system, the method comprising the steps of:

a) having a correlator of the mobile receiver be provided with the SV signal;

b) having the station provide to the mobile receiver the content of at least a portion of the same SV signal;

c) having the mobile receiver perform a correlation of the SV signal with a replica of at least a portion of the SV signal determined from the content of a portion of the SV signal provided by the station; and d) determining the time at which the signal was broadcast by the SV on the basis of the correlation;

wherein the correlation is performed in a way that accounts for any residual modulation of the SV signal by an operation that involves multiplying the SV signal by sinusoids or approximated sinusoids at discrete frequencies spanning a range that encompasses the frequency of the residual modulation.

2. The method of claim 1, wherein the station constructs the replica on the basis of the content of a portion of the SV signal received by the station.

3. The method of claim 1, wherein the mobile receiver constructs the replica on the basis of the content of a portion of the SV signal received by the station.

4. The method of claim 1, wherein the multiplying of the SV signal by sinusoids at discrete frequencies is followed by a coherent integration for each discrete frequency.

5. The method of claim 1, wherein the multiplying of the SV signal by sinusoids at discrete frequencies is preceded by a plurality of subcorrelations of portions of the replica with correspondingly sized portions of the SV signal, each of which is then multiplied by the sinusoids at discrete frequencies and added together in a coherent integration.

6. The method of claim 5, further comprising the step of non-coherently integrating over a plurality of outputs of the coherent integration.

7. The method of claim 6, wherein the step of non-coherently integrating over a plurality of outputs of the coherent integration includes a step of performing an operation selected from the group consisting of: taking the absolute value of each output of the coherent integration, squaring each output of the coherent integration, and, beginning with the second output, multiplying each output of the coherent integration by the complex conjugate of the value of the previous output of the coherent integration.

8. The method of claim 1, wherein the residual modulation is a residual sinusoidal modulation.

9. An apparatus for determining the time at which a satellite vehicle (SV) signal received by a mobile receiver was broadcast by the SV, the SV signal having been de-spread and approximately demodulated but including some residual modulation, the mobile receiver being located in the coverage area of a station of a wireless communication system, the apparatus comprising:
 a) means for providing the SV signal to a correlator of the mobile receiver;
 b) means for receiving from the station the content of at least a portion of the same SV signal;
 c) means for having the mobile receiver perform a correlation of the SV signal with a replica of at least a portion of the SV signal determined from the content of a portion of the SV signal provided by the station; and
 d) means for determining the time at which the signal was broadcast by the SV on the basis of the correlation;
wherein the correlation is performed in a way that accounts for any residual modulation of the SV signal by an operation that involves multiplying the SV signal sinusoids or approximated sinusoids at discrete frequencies spanning a range that encompasses the frequency of the residual modulation.

10. The apparatus of claim 9, wherein the station constructs the replica on the basis of the content of a portion of the SV signal received by the station.

11. The apparatus of claim 9, wherein the mobile receiver constructs the replica on the basis of the content of a portion of the SV signal received by the station.

12. The apparatus of claim 9, wherein the multiplying of the SV signal by sinusoids at discrete frequencies is followed by a coherent integration for each discrete frequency.

13. The apparatus of claim 9, wherein the multiplying of the SV signal by sinusoids at discrete frequencies is preceded by a plurality of subcorrelations of portions of the replica with correspondingly sized portions of the SV signal, each of which is then multiplied by the sinusoids at discrete frequencies and added together in a coherent integration.

14. The apparatus of claim 13, further comprising means for non-coherently integrating over a plurality of outputs of the coherent integration.

15. The apparatus of claim 14, wherein the means for non-coherently integrating over a plurality of outputs of the coherent integration includes means for performing an operation selected from the group consisting of: taking the absolute value of each output of the coherent integration, squaring each output of the coherent integration, and, beginning with the second output, multiplying each output of the coherent integration by the complex conjugate of the value of the previous output of the coherent integration.

16. The apparatus of claim 9, wherein the residual modulation is a residual sinusoidal modulation.

17. A system, comprising:
 a) an apparatus for determining the time at which a satellite vehicle (SV) signal received by a mobile receiver was broadcast by the SV, the SV signal having been de-spread and approximately demodulated but including some residual modulation, the mobile receiver being located in the coverage area of a station of a wireless communication system, the apparatus comprising:
  i) means for providing the SV signal to a correlator of the mobile receiver;
  ii) means for receiving from the station the content of at least a portion of the same SV signal;
  iii) means for having the mobile receiver perform a correlation of the SV signal with a replica of at least a portion of the SV signal determined from the content of a portion of the SV signal provided by the station;
  iv) means for determining the time at which the signal was broadcast by the SV on the basis of the correlation; and
 wherein the correlation is performed in a way that accounts for any residual modulation of the SV signal by an operation that involves multiplying the SV signal by sinusoids or approximated sinusoids at discrete frequencies spanning a range that encompasses the frequency of the residual modulation; and
 b) a station, responsive to the same SV signal as the mobile receiver, for providing the content of at least a portion of the same SV signal as received by the mobile receiver.

18. The system of claim 17, wherein the station constructs the replica on the basis of the content of a portion of the SV signal received by the station.

19. The system of claim 17, wherein the mobile receiver constructs the replica on the basis of the content of a portion of the SV signal received by the station.

20. The system of claim 17, wherein the multiplying of the SV signal by sinusoids at discrete frequencies is followed by a coherent integration for each discrete frequency.

21. The system of claim 17, wherein the multiplying of the SV signal by sinusoids at discrete frequencies is preceded by a plurality of subcorrelations of portions of the replica with correspondingly sized portions of the SV signal, each of which is then multiplied by the sinusoids at discrete frequencies and added together in a coherent integration.

22. The system of claim 21, further comprising means for non-coherently integrating over a plurality of outputs of the coherent integration.

23. The system of claim 22, wherein the means for non-coherently integrating over a plurality of outputs of the coherent integration includes means for performing an operation selected from the group consisting of: taking the absolute value of each output of the coherent integration, squaring each output of the coherent integration, and, beginning with the second output, multiplying each output of the coherent integration by the complex conjugate of the value of the previous output of the coherent integration.

24. The system of claim 17, wherein the residual modulation is a residual sinusoidal modulation.

\* \* \* \* \*

UNITED STATES PATENT AND TRADEMARK OFFICE
CERTIFICATE OF CORRECTION

PATENT NO.   : 6,459,407 B1  Page 1 of 1
DATED        : October 1, 2002
INVENTOR(S)  : David Akopian et al.

It is certified that error appears in the above-identified patent and that said Letters Patent is hereby corrected as shown below:

Column 1,
Line 23, "system" should be -- signal --.

Column 6,
Line 63, "gives" should be -- gives a --.

Column 7,
Line 23, "known" should be -- know --.
Line 54, "transforms" should be -- transforms for --.

Column 11,
Line 55, "signal" should be -- signal by --.

Signed and Sealed this

Eighth Day of April, 2003

JAMES E. ROGAN
*Director of the United States Patent and Trademark Office*